US012682635B2

(12) United States Patent
Lovitt et al.

(10) Patent No.: US 12,682,635 B2
(45) Date of Patent: Jul. 14, 2026

(54) SOFTWARE-BASED USER INTERFACE ELEMENT ANALOGUES FOR PHYSICAL DEVICE ELEMENTS

(71) Applicant: META PLATFORMS TECHNOLOGIES, LLC, Menlo Park, CA (US)

(72) Inventors: Andrew Lovitt, Redmond, WA (US); Sebastian Sztuk, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 421 days.

(21) Appl. No.: 17/558,185

(22) Filed: Dec. 21, 2021

(65) Prior Publication Data

US 2023/0196765 A1     Jun. 22, 2023

(51) Int. Cl.
| | |
|---|---|
| *G06V 20/20* | (2022.01) |
| *G02B 27/01* | (2006.01) |
| *G06F 3/01* | (2006.01) |
| *G06T 19/00* | (2011.01) |
| *G06V 10/20* | (2022.01) |

(52) U.S. Cl.
CPC ........... *G06V 20/20* (2022.01); *G02B 27/017* (2013.01); *G06F 3/017* (2013.01); *G06T 19/006* (2013.01); *G06V 10/255* (2022.01); *G02B 2027/0178* (2013.01)

(58) Field of Classification Search
CPC .... G06V 20/20; G06V 10/255; G02B 27/017; G02B 2027/0178; G06F 3/017; G06F 3/014; G06F 3/011; G06T 19/006
See application file for complete search history.

(56) References Cited

U.S. PATENT DOCUMENTS

| | | |
|---|---|---|
| 8,417,703 B2 | 4/2013 | Kiang et al. |
| 8,923,995 B2 | 12/2014 | Lindahl et al. |
| 9,389,829 B2 | 7/2016 | Donaldson et al. |

(Continued)

OTHER PUBLICATIONS

CNBC: "This Wearable Allows You to Control Machines with Your Mind," YouTube, Jul. 17, 2018, 4 pages, Retrieved from the Internet: URL: https://www.youtube.com/watch?v=oD4efk8T2X4.

(Continued)

*Primary Examiner* — Han Hoang
(74) *Attorney, Agent, or Firm* — Greenberg Traurig, LLP

(57) ABSTRACT

A client device of a user (e.g., a headset) provides a software-based user interface, not relying solely on physical buttons built into the client device itself. The client device's user interface system can render the user interface using graphical, virtual user interface elements that take the place of physical buttons, reducing device manufacturing costs, improving user interface reliability, and allowing greater user interface flexibility. Information on user movements can then be obtained using a separate wearable device, and the client device can use such information to determine whether the user's movements indicate interactions with the virtual user interface elements, taking appropriate actions if so. The client device's user interface system can also render the user interface using sounds made to appear to emanate from particular locations. Subsequent user movements can then be analyzed to determine whether they indicate the particular locations corresponding to the sound-based elements.

20 Claims, 5 Drawing Sheets

(56) References Cited

U.S. PATENT DOCUMENTS

| 9,563,278 | B2 | 2/2017 | Xiang et al. | |
| 9,886,236 | B2 | 2/2018 | Kauffmann | |
| 9,971,492 | B2 | 5/2018 | Chandler et al. | |
| 10,747,371 | B1* | 8/2020 | Kulbida | G06F 3/0425 |
| 10,891,676 | B1* | 1/2021 | Kan | G06Q 30/0643 |
| 2015/0145653 | A1 | 5/2015 | Katingari et al. | |
| 2015/0358614 | A1 | 12/2015 | Jin | |
| 2016/0014478 | A1* | 1/2016 | Ejima | H04N 21/4828 |
| | | | | 725/32 |
| 2017/0123487 | A1 | 5/2017 | Hazra et al. | |
| 2018/0139565 | A1* | 5/2018 | Norris | H04S 1/007 |
| 2019/0212817 | A1 | 7/2019 | Kaifosh et al. | |
| 2019/0212823 | A1* | 7/2019 | Keller | G06F 3/0426 |
| 2020/0104580 | A1* | 4/2020 | Keen | G06F 21/32 |
| 2021/0109593 | A1 | 4/2021 | Zhang et al. | |
| 2021/0133448 | A1 | 5/2021 | Kim et al. | |
| 2022/0121288 | A1* | 4/2022 | Wu | G06F 3/0346 |
| 2022/0404616 | A1* | 12/2022 | Bamberger | G06F 1/32 |
| 2023/0074298 | A1* | 3/2023 | Rome | G06F 16/24578 |

OTHER PUBLICATIONS

Weedmark D., "How to Disable TouchPad While the USB Mouse is Plugged in," Small Business-CHRON, Apr. 24, 2019, 7 pages, Retrieved from the Internet: URL: https://smallbusiness.chron.com/disable-touchpad-usb-mouse-plugged-52685.html.

International Search Report and Written Opinion for International Application No. PCT/US2022/053273, mailed Mar. 22, 2023, 12 pages.

International Preliminary Report on Patentability for International Application No. PCT/US2022/053273, mailed Jul. 4, 2024, 10 pages.

* cited by examiner

Headset 200

Frame 210

Tissue Transducer 270

Audio Controller 250

Speaker 260

Acoustic Sensor 280

Display Element 220

Imaging Device 230

Position Sensor 290

Illuminator 240

SOFTWARE-BASED USER INTERFACE ELEMENT ANALOGUES FOR PHYSICAL DEVICE ELEMENTS

FIELD OF ART

This disclosure relates generally to electronic user interfaces, and more particularly, to convenient user interface elements that can be interacted with using few or no additional peripheral devices or physical control elements.

BACKGROUND

Humans interact with digital systems using a number of different input mechanisms. For example, keyboards and mice are typical input mechanisms for standard desktop or laptop computers. Pressable buttons and movable sliders or wheels are common input mechanisms, appearing on standard keyboards and mice, as well as more recent and/or custom devices such as virtual reality (VR) or augmented reality (AR) immersive head-mounted displays (HMDs) or AR glasses or other lenses. Digital devices may have displays on which a user interface is displayed.

However, the conventional input devices of such digital systems have a number of shortcomings. For example, physical buttons and sliders are comparatively expensive to manufacture, and tend to be error-prone and breakable, as well as being static and hence unable to be readily adapted to different situations. Displays typically also use a high amount of power relative to other components of a computer, and so are taxing on the batteries of battery-powered portable devices.

SUMMARY

A client device of a user (e.g., a headset) provides a software-based user interface, not relying solely on physical buttons built into the client device itself. The client device's user interface system can render the user interface using graphical, virtual user interface elements that take the place of physical buttons or other components, reducing device manufacturing costs, improving user interface reliability, and allowing greater user interface flexibility. Information on user movements can then be obtained using a separate wearable device, and the client device can use such information to determine whether the user's movements indicate interactions with the virtual user interface elements, taking appropriate actions if so.

The client device's user interface system can also render the user interface using sound, applying transformations to sounds representing the various user interface elements so that the elements appear to be emanating from particular locations. Subsequent user movements can then be analyzed to determine whether they indicate the particular locations corresponding to the sound-based elements. Using a sound-based user interface provides an opportunity for the client device to disable its display, thereby conserving a significant amount of power and increasing battery life.

Physical interaction sites—non-functional physical representations of functional physical user interface components, may be located on the client device, and the client device's user interface system may detect interaction with the sites in a manner similar to the detection of interactions with virtual user interface elements.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
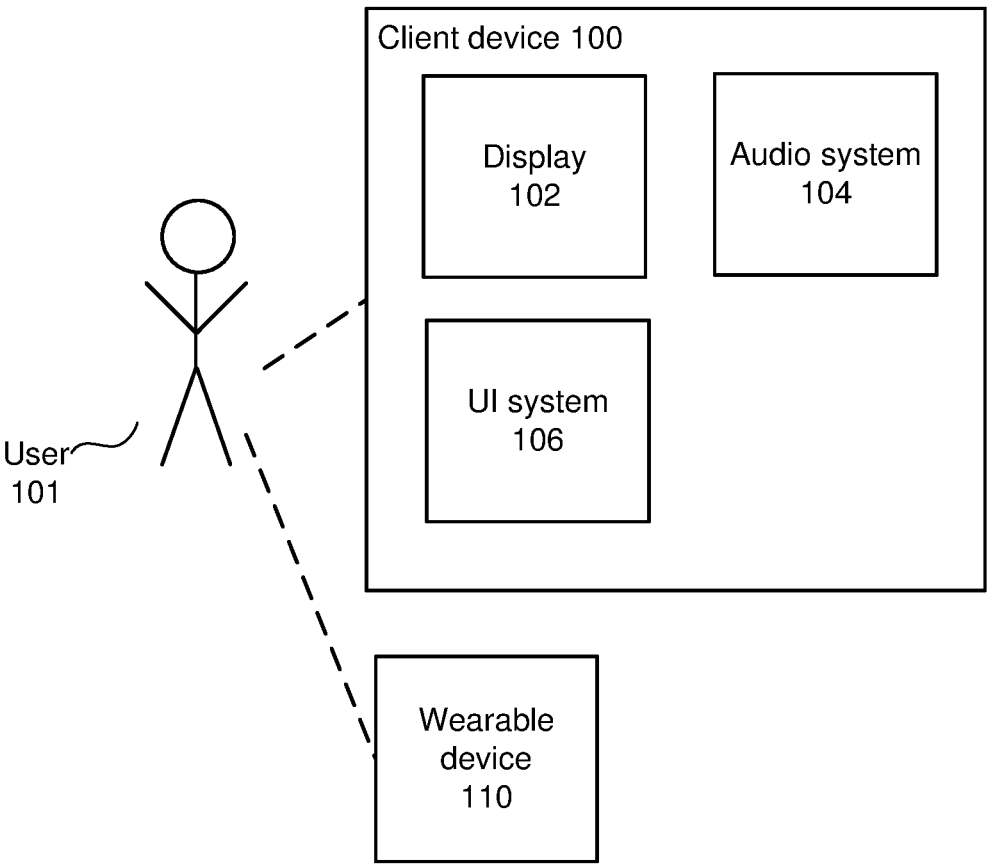
FIG. 1 is a block diagram illustrating an environment in which a user provides input to, and otherwise interacts with, a client device, according to some embodiments.

FIG. 1 is a block diagram illustrating an environment in which a user provides input to, and otherwise interacts with, a client device, according to some embodiments. More specifically, a user 101 has a client device 100 with one or more displays 102 on which visuals may be displayed, an audio system 104 for outputting and inputting audio (including applying spatial transformations to achieve spatial effects), and a user interface system 106 that generates the visuals or sounds for a user interface (e.g., an AR or VR UI) that is displayed on the display 102 and that analyzes user motion to determine whether the user is interacting with the generated user interface elements. The user 101 may additionally have a wearable device 110, such as a smart wristwatch. The wearable device has sensors that obtain readings from which information about user movement, position, and/or actions may be derived. This information is communicated to the client device 100 via short-range wireless (e.g., ultra-wideband (UWB) or Bluetooth Low Energy (BLE)); using the information, the client device then determines whether, and how, the user is interacting with the user interface displayed on the display 102.

Figure 2A:
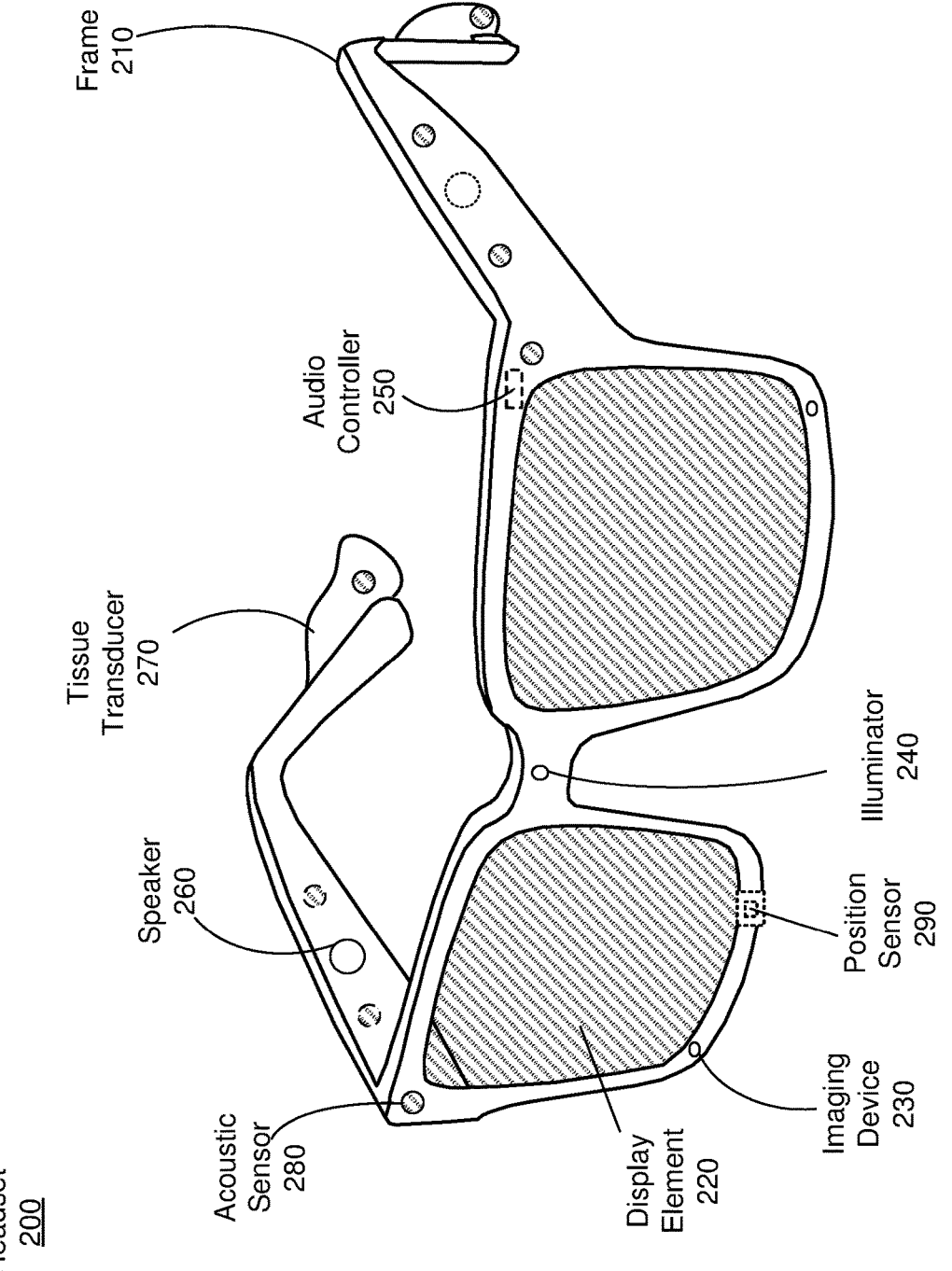
FIGS. 2A and 2B are perspective views of embodiments in which headset client devices are implemented as an eyewear device and as a head-mounted display, respectively.
Figure 2B:
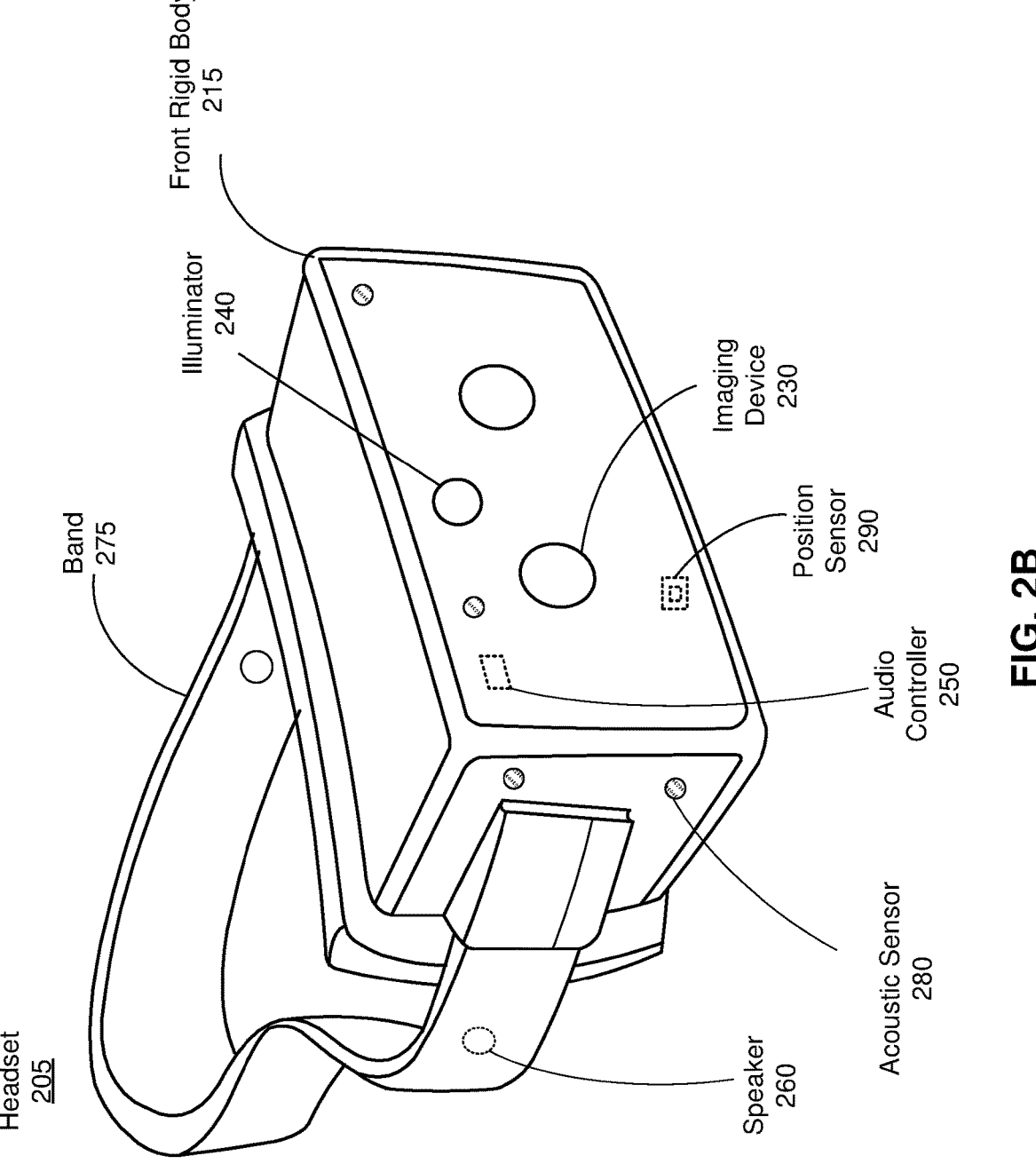

The client device 100 can be various different types of computing devices capable of displaying a user interface. In some embodiments the client device 100 uses virtual reality (VR) or augmented reality (AR) when displaying the user interface, such as with a VR head-mounted display HMD or AR eyewear. In some embodiments, the client device 100 may also be a smart phone, a tablet device, a laptop computer, or the like. FIGS. 2A and 2B provide example embodiments in which the client device 100 is a VR HMD or AR eyewear, respectively.

Example Headsets

FIG. 2A is a perspective view of a headset 200 implemented as an eyewear device, in accordance with one or more embodiments. In some embodiments, the eyewear device is a near eye display (NED). In general, the headset 200 may be worn on the face of a user such that content (e.g., media content) is presented using a display assembly and/or an audio system. However, the headset 200 may also be used such that media content is presented to a user in a different manner. Examples of media content presented by the headset 200 include one or more images, video, audio, or some combination thereof. The headset 200 includes a frame, and may include, among other components, a display assembly including one or more display elements 220, a depth camera assembly (DCA), an audio system, and a position sensor 290. While FIG. 2A illustrates the components of the headset 200 in example locations on the headset 200, the components may be located elsewhere on the headset 200, on a peripheral device paired with the headset 200, or some combination thereof. Similarly, there may be more or fewer components on the headset 200 than what is shown in FIG. 2A.

The frame 210 holds the other components of the headset 200. The frame 210 includes a front part that holds the one or more display elements 220 and end pieces (e.g., temples) to attach to a head of the user. The front part of the frame 210 bridges the top of a nose of the user. The length of the end pieces may be adjustable (e.g., adjustable temple length) to fit different users. The end pieces may also include a portion that curls behind the ear of the user (e.g., temple tip, ear piece).

In some embodiments, the headset 200 includes physical, but non-functional (or not fully functional), interaction sites. The physical interaction sites represent a physical component, such as a button, but are not functional (or not fully functional), instead serving as placeholders that may be interacted with. The interaction sites may, for example, physically indicate the physical components that they represent, such as with a color, or a physical piece of material (e.g., a raised bump), or even a physical piece of material with some degree of functionality (e.g., a contact sensor), but lack the more intricate (and expensive-to-manufacture) functionality, such as (in the case of buttons) the ability to be physically clicked up and down, sensors to report clicks, or the like. Thus, the physical interaction sites indicate to the user the locations with which the user can virtually interact, as is described in additional detail below. The physical interaction sites may be located on different parts of the headset, such as along the edges of the frame 210 (e.g., near the temple, so as to be convenient for the user to touch). The headset 200 (or other type of client device 100) may cause haptic feedback to be provided to the user when the user is interacting with, or able to interact with, a physical interaction site, such as by sending a command to the wearable device 110 to provide haptic feedback (e.g., causing a smart watch wearable device to vibrate when the user is moving a virtual slider UI element corresponding to a physical interaction site, or when the user's hand is near that UI element). This helps to make it more obvious to the user that the user can use the physical interaction site as a UI element.

The one or more display elements 220 provide light to a user wearing the headset 200. As illustrated the headset includes a display element 220 for each eye of a user. In some embodiments, a display element 220 generates image light that is provided to an eyebox of the headset 200. The eyebox is a location in space that an eye of the user occupies while wearing the headset 200. For example, a display element 220 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 200. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 220 are opaque and do not transmit light from a local area around the headset 200. The local area is the area surrounding the headset 200. For example, the local area may be a room that a user wearing the headset 200 is inside, or the user wearing the headset 200 may be outside and the local area is an outside area. In this context, the headset 200 generates VR content. Alternatively, in some embodiments, one or both of the display elements 220 are at least partially transparent, such that light from the local area may be combined with light from the one or more display elements to produce AR and/or MR content.

In some embodiments, a display element 220 does not generate image light, and instead is a lens that transmits light from the local area to the eyebox. For example, one or both of the display elements 220 may be a lens without correction (non-prescription) or a prescription lens (e.g., single vision, bifocal and trifocal, or progressive) to help correct for defects in a user's eyesight. In some embodiments, the display element 220 may be polarized and/or tinted to protect the user's eyes from the sun.

In some embodiments, the display element 220 may include an additional optics block (not shown). The optics block may include one or more optical elements (e.g., lens, Fresnel lens, etc.) that direct light from the display element 220 to the eyebox. The optics block may, e.g., correct for aberrations in some or all of the image content, magnify some or all of the image, or some combination thereof.

The DCA determines depth information for a portion of a local area surrounding the headset 200. The DCA includes one or more imaging devices 230 and a DCA controller (not shown in FIG. 2A), and may also include an illuminator 240. In some embodiments, the illuminator 240 illuminates a portion of the local area with light. The light may be, e.g., structured light (e.g., dot pattern, bars, etc.) in the infrared (IR), IR flash for time-of-flight, etc. In some embodiments, the one or more imaging devices 230 capture images of the portion of the local area that include the light from the illuminator 240. In one embodiment, the captured images may include one or more images and/or videos of the user of the headset 200 (e.g., the user wears the headset 200 and stands in front of a mirror). In some embodiments, the captured images may include one or more images and/or videos of one or more separate headset users (e.g., the headset 200 captures images of the local area that includes multiple headset users). As illustrated, FIG. 2A shows a single illuminator 240 and two imaging devices 230. In alternate embodiments, there is no illuminator 240 and at least two imaging devices 230.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 240), some other technique to determine depth of a scene, or some combination thereof.

Figure 3:
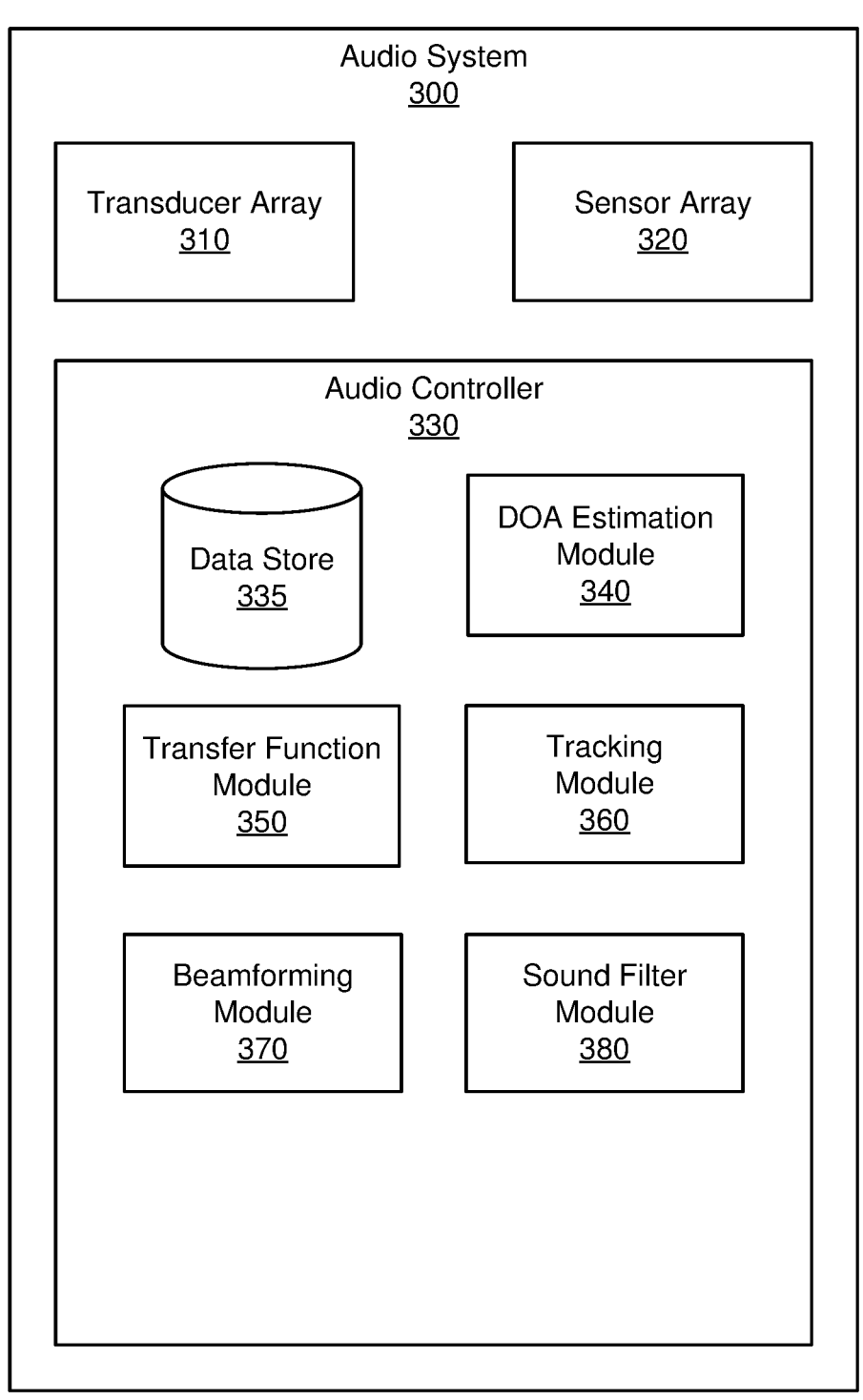
FIG. 3 is a block diagram of an audio system, in accordance with one or more embodiments.

The audio system provides audio content. The audio system includes a transducer array, a sensor array, and an audio controller 250. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server. The audio system may implement the audio system 104 of FIG. 1. FIG. 3 discloses additional details of the audio system according to some embodiments.

The transducer array presents sound to the user. In some embodiments, the transducer array presents spatialized audio content based on one or more sound filters. The transducer array includes a plurality of transducers. A transducer may be a speaker 260 or a tissue transducer 270 (e.g., a bone conduction transducer or a cartilage conduction transducer). Although the speakers 260 are shown exterior to the frame 210, the speakers 260 may be enclosed in the frame 210. In some embodiments, instead of individual speakers for each ear, the headset 200 includes a speaker array comprising multiple speakers integrated into the frame 210 to improve directionality of presented audio content. The tissue transducer 270 couples to the head of the user and directly vibrates tissue (e.g., bone or cartilage) of the user to generate sound. The number and/or locations of transducers may be different from what is shown in FIG. 2A.

The sensor array detects sounds within the local area of the headset 200. The sensor array includes a plurality of acoustic sensors 280. An acoustic sensor 280 captures sounds emitted from one or more sound sources in the local area (e.g., a room). Each acoustic sensor is configured to detect sound and convert the detected sound into an electronic format (analog or digital). The acoustic sensors 280 may be acoustic wave sensors, microphones, sound transducers, or similar sensors that are suitable for detecting sounds.

In some embodiments, one or more acoustic sensors 280 may be placed in an ear canal of each ear (e.g., acting as binaural microphones). In some embodiments, the acoustic sensors 280 may be placed on an exterior surface of the headset 200, placed on an interior surface of the headset 200, separate from the headset 200 (e.g., part of some other device), or some combination thereof. The number and/or locations of acoustic sensors 280 may be different from what is shown in FIG. 2A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 200.

The audio controller 250 processes information from the sensor array that describes sounds detected by the sensor array. The audio controller 250 may comprise a processor and a computer-readable storage medium. The audio controller 250 may be configured to determine pose of the user, generate head-related transfer functions (HRTFs), dynamically update HRTFs, generate direction of arrival (DOA) estimates, track the location of sound sources, form beams in the direction of sound sources, classify sound sources, generate sound filters for the speakers 260, or some combination thereof. The audio controller 250 is described in more detail below with respect to FIG. 3.

The position sensor 290 generates one or more measurement signals in response to motion of the headset 200. The position sensor 290 may be located on a portion of the frame 210 of the headset 200. The position sensor 290 may include an inertial measurement unit (IMU). Examples of position sensor 290 include: one or more accelerometers, one or more gyroscopes, one or more magnetometers, another suitable type of sensor that detects motion, a type of sensor used for error correction of the IMU, or some combination thereof. The position sensor 290 may be located external to the IMU, internal to the IMU, or some combination thereof.

In some embodiments, the headset 200 may provide for simultaneous localization and mapping (SLAM) for a position of the headset 200 and updating of a model of the local area. For example, the headset 200 may include a passive camera assembly (PCA) that generates color image data. The PCA may include one or more RGB cameras that capture images of some or all of the local area. In some embodiments, some or all of the imaging devices 230 of the DCA may also function as the PCA. The images captured by the PCA and the depth information determined by the DCA may be used to determine parameters of the local area, generate a model of the local area, update a model of the local area, or some combination thereof. Furthermore, the position sensor 290 tracks the position (e.g., location and pose) of the headset 200 within the room.

The audio system dynamically updates a customized HRTF model for the user. The audio system receives one or more images of the user captured by one or more imaging devices (e.g., the one or more imaging devices 230). The audio system determines a pose (e.g., torso shape, ear shape, head-torso orientation, etc.) of the user based on the captured images. The audio system dynamically updates the customized HRTF model based on the determined pose. The audio system generates one or more sound filters using the updated HRTF model and applies the sound filters to audio content to generate spatialized audio content. The audio system provides the spatialized audio content to the user via the speakers 260.

FIG. 2B is a perspective view of a headset 205 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 215 and a band 275. The headset 205 includes many of the same components described above with reference to FIG. 2A, but modified to integrate with the HMD form factor. For example, the HMD includes a display assembly, a DCA, the audio system of FIG. 2A, and the position sensor 290. FIG. 2B shows the illuminator 240, a plurality of the speakers 260, a plurality of the imaging devices 230, a plurality of acoustic sensors 280, and the position sensor 290. The speakers 260 may be located in various locations, such as coupled to the band 275 (as shown), coupled to front rigid body 215, or may be configured to be inserted within the ear canal of a user. Like the headset 200 of FIG. 2A, the headset 205 of FIG. 2B may also include physical, but non-functional, interaction sites, such as along the edges of the front rigid body 215.

Audio System

FIG. 3 is a block diagram of an audio system 300, in accordance with one or more embodiments. The audio system 104 in FIG. 1 may be an embodiment of the audio system 300. The audio system 300 performs processing on audio, including applying spatial transformations to audio. The audio system 300 further generates one or more acoustic transfer functions for a user. The audio system 300 may then use the one or more acoustic transfer functions to generate audio content for the user, such as applying spatial transformations. In the embodiment of FIG. 3, the audio system 300 includes a transducer array 310, a sensor array 320, and an audio controller 330. Some embodiments of the audio system 300 have different components than those described here. Similarly, in some cases, functions can be distributed among the components in a different manner than is described here.

The transducer array 310 is configured to present audio content. The transducer array 310 includes one or more transducers. A transducer is a device that provides audio content. A transducer may be, e.g., a speaker, or some other device that provides audio content. When the client device 100 into which the audio system 300 is incorporated is a device such as a VR headset or AR glasses, the transducer array 310 may include a tissue transducer. A tissue transducer may be configured to function as a bone conduction transducer or a cartilage conduction transducer. The transducer array 310 may present audio content via air conduction (e.g., via one or more speakers), via bone conduction (via one or more bone conduction transducer), via cartilage conduction (via one or more cartilage conduction transducers), or some combination thereof. In some embodiments, the transducer array 310 may include one or more transducers to cover different parts of a frequency range. For example, a piezoelectric transducer may be used to cover a first part of a frequency range and a moving coil transducer may be used to cover a second part of a frequency range.

The bone conduction transducers (if any) generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 330, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum. A small portion of the acoustic pressure waves may propagate into the local area.

The transducer array 310 generates audio content in accordance with instructions from the audio controller 330. The audio content may be spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 300. The transducer array 310 may be coupled to a wearable client device (e.g., a headset). In alternate embodiments, the transducer array 310 may be a plurality of speakers that are separate from the wearable device (e.g., coupled to an external console).

The transducer array 310 may include one or more speakers in a dipole configuration. The speakers may be located in an enclosure having a front port and a rear port. A first portion of the sound emitted by the speaker is emitted from the front port. The rear port allows a second portion of the sound to be emitted outwards from the rear cavity of the enclosure in a rear direction. The second portion of the sound is substantially out of phase with the first portion emitted outwards in a front direction from the front port.

In some embodiments, the second portion of the sound has a (e.g., 180°) phase offset from the first portion of the sound, resulting overall in dipole sound emissions. As such, sounds emitted from the audio system experience dipole acoustic cancellation in the far-field where the emitted first portion of the sound from the front cavity interfere with and cancel out the emitted second portion of the sound from the rear cavity in the far-field, and leakage of the emitted sound into the far-field is low. This is desirable for applications where privacy of a user is a concern, and sound emitted to people other than the user is not desired. For example, since the ear of the user wearing the headset is in the near-field of the sound emitted from the audio system, the user may be able to exclusively hear the emitted sound.

The sensor array 320 detects sounds within a local area surrounding the sensor array 320. The sensor array 320 may include a plurality of acoustic sensors that each detect air pressure variations of a sound wave and convert the detected sounds into an electronic format (analog or digital). The plurality of acoustic sensors may be positioned on a headset, on a user (e.g., in an ear canal of the user), on a neckband, or some combination thereof. An acoustic sensor may be, e.g., a microphone, a vibration sensor, an accelerometer, or any combination thereof. In some embodiments, the sensor array 320 is configured to monitor the audio content generated by the transducer array 310 using at least some of the plurality of acoustic sensors. Increasing the number of sensors may improve the accuracy of information (e.g., directionality) describing a sound field produced by the transducer array 310 and/or sound from the local area.

The sensor array 320 detects environmental conditions of the client device 100 into which it is incorporated. For example, the sensor array 320 detects an ambient noise level. The sensor array 320 may also detect sound sources in the local environment, such as persons speaking. The sensor array 320 detects acoustic pressure waves from sound sources and converts the detected acoustic pressure waves into analog or digital signals, which the sensor array 320 transmits to the audio controller 330 for further processing.

The audio controller 330 controls operation of the audio system 300. In the embodiment of FIG. 3, the audio controller 330 includes a data store 335, a DOA estimation module 340, a transfer function module 350, a tracking module 360, a beamforming module 370, and an audio filter module 380. The audio controller 330 may be located inside a headset client device 100, in some embodiments. Some embodiments of the audio controller 330 have different components than those described here. Similarly, functions can be distributed among the components in different manners than described here. For example, some functions of the controller may be performed external to the headset. The user may opt in to allow the audio controller 330 to transmit data captured by the headset to systems external to the headset, and the user may select privacy settings controlling access to any such data.

The data store 335 stores data for use by the audio system 300. Data in the data store 335 may include a privacy setting, attenuation levels of frequency bands associated with privacy settings, and audio filters and related parameters. The data store 335 may further include sounds recorded in the local area of the audio system 300, audio content, head-related transfer functions (HRTFs), transfer functions for one or more sensors, array transfer functions (ATFs) for one or more of the acoustic sensors, sound source locations, virtual model of local area, direction of arrival estimates, and other data relevant for use by the audio system 300, or any combination thereof. The data store 335 may include observed or historical ambient noise levels in a local environment of the audio system 300. The data store 335 may include properties describing sound sources in a local environment of the audio system 300, such as whether sound sources are typically humans speaking; natural phenomena such as wind, rain, or waves; machinery; external audio systems; or any other type of sound source.

The DOA estimation module 340 is configured to localize sound sources in the local area based in part on information from the sensor array 320. Localization is a process of determining where sound sources are located relative to the user of the audio system 300. The DOA estimation module 340 performs a DOA analysis to localize one or more sound sources within the local area. The DOA analysis may include analyzing the intensity, spectra, and/or arrival time of each sound at the sensor array 320 to determine the direction from which the sounds originated. In some cases, the DOA analysis may include any suitable algorithm for analyzing a surrounding acoustic environment in which the audio system 300 is located.

For example, the DOA analysis may be designed to receive input signals from the sensor array 320 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 320 received the direct-path audio signal. The determined angle may then be used to identify the DOA for the received input signal. Other algorithms not listed above may also be used alone or in combination with the above algorithms to determine DOA.

In some embodiments, the DOA estimation module 340 may also determine the DOA with respect to an absolute position of the audio system 300 within the local area. The position of the sensor array 320 may be received from an external system (e.g., some other component of a headset, an artificial reality console, a mapping server, a position sensor, etc.). The external system may create a virtual model of the local area, in which the local area and the position of the audio system 300 are mapped. The received position information may include a location and/or an orientation of some or all of the audio system 300 (e.g., of the sensor array 320). The DOA estimation module 340 may update the estimated DOA based on the received position information.

The transfer function module 350 is configured to generate one or more acoustic transfer functions. Generally, a transfer function is a mathematical function giving a corresponding output value for each possible input value. Based on parameters of the detected sounds, the transfer function module 350 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 320. Accordingly, for a sound source there is a corresponding transfer function for each of the acoustic sensors in the sensor array 320. And collectively the set of transfer functions is referred to as an ATF. Accordingly, for each sound source there is a corresponding ATF. Note that the sound source may be, e.g., someone or something generating sound in the local area, the user, or one or more transducers of the transducer array 310. The ATF for a particular sound source location relative to the sensor array 320 may differ from user to user due to a person's anatomy (e.g., ear shape, shoulders, etc.) that affects the sound as it travels to the person's ears. Accordingly, in some embodiments the ATFs of the sensor array 320 are personalized for each user of the audio system 300.

In some embodiments, the transfer function module 350 determines one or more HRTFs for a user of the audio system 300. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 350 may determine HRTFs for the user using a calibration process. In some embodiments, the transfer function module 350 may provide information about the user to a remote system. The user may adjust privacy settings to allow or prevent the transfer function module 350 from providing the information about the user to any remote systems. The remote system determines a set of HRTFs that are customized to the user using, e.g., machine learning, and provides the customized set of HRTFs to the audio system 300.

The tracking module 360 is configured to track locations of one or more sound sources. The tracking module 360 may compare current DOA estimates and compare them with a stored history of previous DOA estimates. In some embodiments, the audio system 300 may recalculate DOA estimates on a periodic schedule, such as once per second, or once per millisecond. The tracking module may compare the current DOA estimates with previous DOA estimates, and in response to a change in a DOA estimate for a sound source, the tracking module 360 may determine that the sound source moved. In some embodiments, the tracking module 360 may detect a change in location based on visual information received from the headset or some other external source. The tracking module 360 may track the movement of one or more sound sources over time. The tracking module 360 may store values for a number of sound sources and a location of each sound source at each point in time. In response to a change in a value of the number or locations of the sound sources, the tracking module 360 may determine that a sound source moved. The tracking module 360 may calculate an estimate of the localization variance. The localization variance may be used as a confidence level for each determination of a change in movement.

The beamforming module 370 is configured to process one or more ATFs to selectively emphasize sounds from sound sources within a certain area while de-emphasizing sounds from other areas. In analyzing sounds detected by the sensor array 320, the beamforming module 370 may combine information from different acoustic sensors to emphasize sound associated from a particular region of the local area while deemphasizing sound that is from outside of the region. The beamforming module 370 may isolate an audio signal associated with sound from a particular sound source from other sound sources in the local area based on, e.g., different DOA estimates from the DOA estimation module 340 and the tracking module 360. The beamforming module 370 may thus selectively analyze discrete sound sources in the local area. In some embodiments, the beamforming module 370 may enhance a signal from a sound source. For example, the beamforming module 370 may apply audio filters which eliminate signals above, below, or between certain frequencies. Signal enhancement acts to enhance sounds associated with a given identified sound source relative to other sounds detected by the sensor array 320.

The audio filter module 380 determines audio filters for the transducer array 310. The audio filter module 380 may generate an audio filter used to adjust an audio signal to mitigate sound leakage when presented by one or more speakers of the transducer array based on the privacy setting.

In some embodiments, the audio filters cause the audio content to be spatialized, such that the audio content appears to originate from a target region. The audio filter module 380 may use HRTFs and/or acoustic parameters to generate the audio filters. The acoustic parameters describe acoustic properties of the local area. The acoustic parameters may include, e.g., a reverberation time, a reverberation level, a room impulse response, etc. In some embodiments, the audio filter module 380 calculates one or more of the acoustic parameters. In some embodiments, the audio filter module 380 requests the acoustic parameters from a mapping server (e.g., as described below with regard to FIG. 8). The audio filter module 380 provides the audio filters to the transducer array 310. In some embodiments, the audio filters may cause positive or negative amplification of sounds as a function of frequency.

The audio system 300 may be part of a headset (such as the headset 200 of FIGS. 2A and 2B) or some other type of client device 100, or separate but communicatively coupled thereto. In some embodiments, the audio system 300 is incorporated into a smart phone client device.

The display 102 and audio system 104 of FIG. 1 may be implemented by various components of FIGS. 2A and/or 2B, such as the display element 220 and imaging device 230, or the speaker 260, acoustic sensor 280, an audio controller 250.

User Interfaces

Returning to FIG. 1, the UI system 106 controls the user interface of the client device 100 in different ways to accomplish different objectives, such as by displaying and allowing interaction with virtual buttons, physical interaction sites, or other UI elements, and/or by presenting a sound-based UI when appropriate to allow dimming or shutting off the display 102 to reduce power consumption.

In some embodiments, the UI system 106 augments the other visuals displayed on the displays 102 with images of virtual UI elements, such as buttons or sliders. The virtual UI elements serve as virtual analogues for physical UI elements that otherwise would need to be built into the client device 100 itself. (Physical interaction sites, which may be included on a headset 205 or 210, likewise serve as physical but non-functional analogues for physical, functional UI elements.) More generally, the virtual UI elements may be any type of control that may be interacted with by a user. Using virtual UI elements (or physical interaction sites), rather than physical elements (e.g., buttons) that are part of the client device, provides a number of benefits, such as reducing the manufacturing expense, removing the risk of breakage of physical parts, and allowing greater flexibility and customizability in the numbers, types, and positions of UI elements. In these embodiments, the UI system 106 requires a way to obtain input about user movements so as to be able to determine whether/how the user is interacting with the virtual UI elements. For this purpose, the user 101 additionally has a wearable device 110. The wearable device has sensors that obtain readings from which information about user movement, position, and/or actions may be derived. This information is communicated to the client device 100 via short-range wireless (e.g., Bluetooth™); using the information, the client device then determines whether, and how, the user is interacting with the user interface displayed on the display 102. The wearable device 110 may be (for example) worn on the hand or arm, such as a smart wristwatch, or a smart ring, though in general the wearable device may be worn anywhere on the body that can provide movement information that can be used to determine which UI elements the user is indicating.

In some embodiments, the UI system 106 alternatively and/or additionally provides a user interface with sound-based elements. In these embodiments, user interface elements (options) are indicated to users aurally, rather than visually. Movements of users are then analyzed to determine which of those options the user intends to select.

Figure 4:
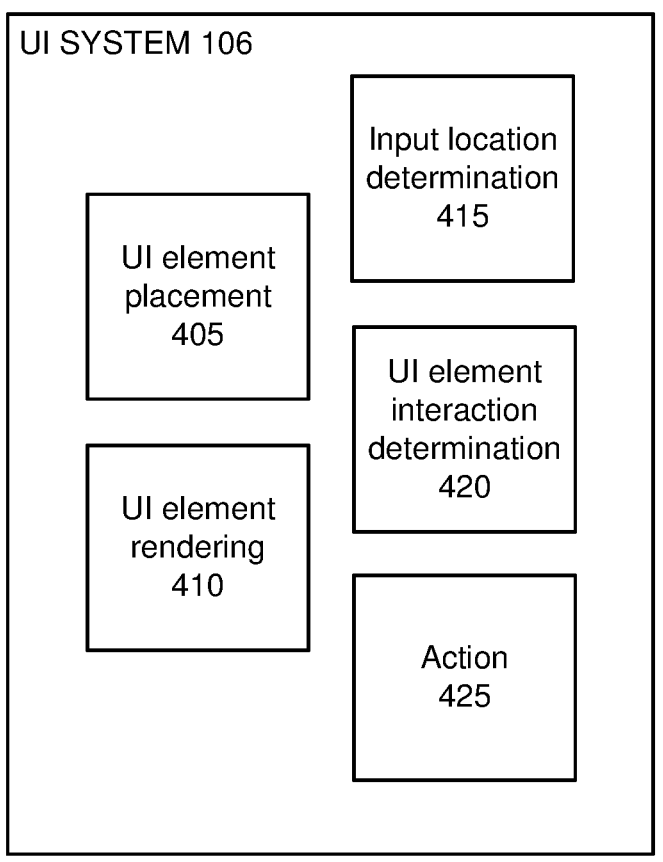
FIG. 4 illustrates the sub-modules of the UI system of FIG. 1, according to some embodiments.

FIG. 4 illustrates the sub-modules of the UI system 106 of FIG. 1, according to some embodiments.

The UI system 106 includes a UI element placement module 405 that determines a location at which to place UI elements for selection by the user. In embodiments in which the UI system 106 uses virtual UI elements, the location of the virtual UI elements represents a position in space relative to the user to whom the UI is being presented, such as an <x, y, z> coordinate.

The location of the virtual UI elements may be determined in various manners in different embodiments. For example, in some embodiments the UI element placement module 405 performs visual analysis of images displayed on the display 102, prior to the addition of the virtual UI elements. For instance, the client device 100 could be smart eyewear, with the display 102 initially displaying an image representing the "normal" view of the world that the user would see through the smart eyewear, and the UI element placement module 405 could accordingly perform visual analysis of the view to identify different objects present within the view (including, for example, portions of the user's own body, such as her hands or arms), and to identify the locations of those objects within the view. The results of the visual analysis can then be used as anchors for placing the virtual UI elements. Returning to the example of smart eyewear, the view might include the user's hands, which would be identified by object analysis; the UI element placement module 405 could then assign a location to a virtual UI element (e.g., a button) that corresponds to the location of a visible part of one of the user's hand, and the user could move a finger of the other hand to that hand, as if pressing the virtual button displayed as being located on that hand.

As another, related example of location determination, in some embodiments the UI element placement module 405 performs visual analysis on an image (e.g., on the view of the user) to distinguish the higher-priority regions of the image from the lower-priority regions, placing the virtual UI elements only within lower-priority regions of the image so as not to obscure the higher-priority regions. For example, higher-priority regions could include regions displaying details that the user may wish to scrutinize, such as regions containing text, regions with high degrees of graphical detail/variation (as opposed to relatively uniform backgrounds), regions that tend to vary considerably over time (e.g., contain movement), or the like. In some embodiments, the visual element placement module 405 alternatively and/or additionally uses an API of the application producing the visuals displayed on the display and/or the user interface, calling a function that returns information about the priorities of the various regions of the display 102, thereby leveraging information that the application itself has about region priorities. In some embodiments, the visual element placement module 405 alternatively and/or additionally uses historical statistics on usage of the user interface in the past by the current user and/or by other users to determine placement of UI elements. For example, the visual element placement module 405 might identify regions of the user interface that have been most frequently interacted with by the user (and/or other users) in the past and place UI elements in or near those locations. The placement may additionally be determined using application settings, or by taking the context into account (such as one mode when the user is stationary, and another mode when the user is exercising).

As another example of location determination, in some embodiments the UI element placement module 405 ranks all or some of the virtual UI elements according to how likely the user is to select or otherwise interact with those elements. The UI element placement module 405 then places the virtual UI elements more likely to be interacted with in more accessible portions of the display, such as nearer to the center of the display, nearer to portions corresponding to the user's hand or other pointing device, or the like. This minimizes the amount of user effort to interact with the virtual UI elements that the UI element placement module 405 determined were more likely to be used by the user, such as by (for example) minimizing the distance that the user will need to move her hand to select the virtual UI elements. In some embodiments, the likelihood of use of a virtual UI element is specified by parameters given by the developer of the application producing the visuals displayed on the display and/or the user interface. In other embodiments, the likelihood of use of a virtual UI element is predicted by the UI system 106 by analyzing historical statistics about prior usage of the current user and/or other users, as noted above.

As yet another example of location determination, in some embodiments environmental audio is also taken into account by the UI element placement module 405. For example, the degree of environmental audio at various locations relative to the display 102 may be analyzed, with greater degrees of audio at certain locations lowering the probability that the UI element placement module 405 will place a UI element in a corresponding location on the display 102. For instance, if there is a high degree of environmental audio coming from near the left side of the display 102, then the UI element placement module 405 may refrain from placing UI elements on the left side of the display (e.g., on the assumption that the scene is complicated towards the left and thus should not be further complicated with an additional UI element).

In embodiments in which the UI system 106 uses sound-based UI elements, the location of the sound-based UI elements are (as with virtual UI elements) representative of a position in space relative to the user. The UI element placement module 405 can determine the locations in different ways in different embodiments. For example, the controlling application may explicitly specify the locations, either with a particular user-relative <x, y, z> position, or with some other indicator that can be mapped to an <x, y, z> position, such as the more general directions "right", "left", "above", "above-right", or the like. As another example, the controlling application may merely specify the set of virtual UI elements, with the UI element placement module 405 assigning a position to each of the virtual UI elements based on the number of virtual UI elements. For example, if there are only two virtual UI elements, the UI element placement module 405 might randomly assign one of the virtual UI elements to a position on the user's left, and the other virtual UI element on the position's right.

The UI system 106 includes a UI element rendering module 410 that renders the UI elements according to their locations as determined by the UI element placement module 405. The term "render" means to make the presence of the UI elements perceptible to the user as if they were located at the given positions. In the case of virtual UI elements displayed visually on the display 102, "rendering" means to make the virtual UI elements visually appear at the given positions on the display. As noted above, the virtual UI elements can be displayed as if they were anchored to particular objects in the scene, e.g., in an orientation appropriate for being anchored on a particular object, such as oriented orthogonally to a surface on which it is anchored.

In the case of sound-based UI elements, "rendering" means to make the UI elements sound as if they were emanating from the location assigned to that element. To achieve this effect, the UI element rendering module 410 can use the transfer function module 350 of FIG. 3 (for example), including using HRTFs, to set the apparent location of a sound-based UI element. For example, if the available sound-based UI elements represented (1) an option to proceed with a current action, represented as being on the left of the user, and (2) an option to go back, represented as being on the right of the user, the UI elements could be rendered by using a text-to-speech algorithm on their respective labels ("e.g., "proceed" and "go back"), applying HRTFs that make the speech for the label "proceed" appear to emanate from the user's left and the speech for the label "go back" appear to emanate from the user's right.

The UI system 106 additionally includes an input location determination module 415 and a UI element interaction determination module 420 that collectively determine whether and how UI elements are interacted with, based on characteristics of the user's gestures (physical movements).

The input location determination module 415 determines a location associated with a user movement. The determination may be accomplished somewhat differently depending on whether the UI elements are being rendered using graphics or using sound. When the UI elements are rendered using graphics, the input location determination module 415 uses sensor data received from the wearable device 110 to determine an <x, y, z> location of the wearable device 110 relative to the user, and (optionally) other movement information, such as rotation orientation, speed, acceleration, and the like.

When UI elements are rendered using sound, the input location determination module 415 may likewise use sensor data from the wearable device 110, e.g., determining the input location based on sensor data of a smart wristwatch indicating that the user appears to be gesturing towards her left. Additionally, the input location determination module 415 may also consider sensor data from the client device 100. Typically, when UI elements are rendered using sound rather than graphics, the display 102 of the client device 100 has been turned off to conserve energy, and there are comparatively few UI elements being presented as options, and so it is possible for the user to indicate one of the rendered UI elements with very general, coarse-grained gestures. For example, the user could turn her head to the left to indicate an option rendered as appearing generally on the user's left side (e.g., the "proceed" option from the above example). The determined locations in such cases may be general (e.g., an indicator designating the leftward direction, in general), or specific <x, y, z> coordinates produced by mapping a general gesture to a specific location.

The UI element interaction determination module 420 uses the locations determined by the input location determination module 415 to more specifically determine which UI elements (if any) are implicated by the user's gesture. For example, the UI element interaction determination module 420 can compare a location determined by the input location determination module 415 to the locations of the rendered UI elements as determined by the UI element placement module 405. The UI element interaction determination module 420 can additionally consider other movement information obtained by the input location determination module 415 to determine whether the user's movement constitutes a gesture that signifies an interaction with a UI element, as opposed to merely being located near a UI element but having a different purpose. For example, accelerometer data from a wristwatch wearable device 110 could be used to determine that the user is rapidly moving her hand in a way consistent with a press of a virtual button. As another example, accelerometer data from a headset client device 100 could indicate that the user is removing the headset, and that therefore any motion is intended by the user purely to remove the headset and not to interact with UI elements, and that therefore the UI elements should be considered disabled for the moment. The UI element interaction determination module 420 may additionally consider other data, such as state data about the various UI elements (e.g., whether the UI elements are presently disabled), when determining whether the user's movement should be considered to be an interaction with a particular UI element.

The UI element interaction determination module 420 may additionally determine (e.g., based on sensor data from the wearable device 110 or the client device 100) which particular type of action is being performed with respect to a particular UI element, if the UI element supports multiple different types of user interactions. For example, sensor data of the wearable device 110 indicating a rightward swiping motion on a UI element could be interpreted as specifying that the UI element should be removed, while a forward-poking motion could be interpreted as specifying that the UI element is being selected or activated. Multi-gesture input may also be analyzed, such as a number of fingers that the user is using to perform the function.

In embodiments in which the headset 200 or 205 includes physical interaction sites, these sites act in a similar manner to the virtual user interface elements presented through visuals or audio, in that they serve as a representation of a physical user interface component (such as a button), rather than a fully functional physical version thereof. The UI element interaction determination module 420 therefore additionally takes the a priori known locations of the physical interaction sites into account when determining which UI elements were interacted with by a given user gesture. For example, if the temple portion of the frame 210 includes a physical interaction site, and the input location determination module 415 determines that a user gesture takes place at or near the known location of that physical interaction site, then the UI element interaction determination module 420 can determine that the user is interacting with that physical interaction site.

The UI system 106 additionally includes an action module 425 that takes an action appropriate to the UI element that is being selected and the type of action being performed on that UI element. The action to take for a particular UI element (and, optionally, action type) may have been previously specified by event handler registration code, such as registering the calling of a particular function when a particular UI element is activated by the user's gesture.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer-implemented method comprising:

transitioning from a first power state to a second power state by dimming or shutting off a display of a client device of a user, wherein the second power state is a lower power state than the first power state;

rendering two or more user interface elements at two or more user-relative locations by, in response to transitioning to the second power state, using spatial sound to cause audio content to appear to originate from the two or more user-relative locations;

receiving sensor data associated with a movement of at least one of the client device or a wearable device of the user;

determining, using the sensor data, a location corresponding to the movement;

identifying, using the determined location, a user interface element among the two or more user interface elements; and calling a function registered in association with the user interface element;

wherein the two or more user interface elements represent options to proceed with a current action and to go back, the two or more user-relative locations are to left and right sides of the user, the two or more user interface elements are rendered using text-to-speech on respective labels thereof and application of the spatial sound to make speech for the respective labels appear to emanate from the two or more user-relative locations, and the sensor data indicates turning of a head of the user toward one of the two or more user-relative locations.

2. The computer-implemented method of claim 1, wherein the application of the spatial sound to make speech for the respective labels appear to emanate from the two or more user-relative locations includes application of head-related transfer functions.

3. The computer-implemented method of claim 1, further comprising determining user-relative locations for a plurality of user interface elements, the determining comprising:

performing visual analysis on an image captured by an imaging device of an augmented reality or virtual reality headset of a user;

identifying objects present within the image based on the visual analysis;

determining locations of the identified objects within the image;

ranking at least some of the user interface elements according to likelihoods of the user interface elements being selected by the user into high-likelihood user interface elements and low-likelihood user interface elements;

identifying lower-priority regions and higher-priority regions within the image displayed on the display based on the performed visual analysis of the image displayed on the display of the augmented reality or the virtual reality headset of the user, wherein lower-priority regions and higher-priority regions are distinguished from one another based on one or more of a presence of text, a uniformity of backgrounds, or an existence of movement; and assigning locations of the user interface elements to be within the lower-priority regions.

4. The computer-implemented method of claim 1, further comprising:

receiving second sensor data associated with a second movement of a wearable device of the user;

determining that the second movement corresponds to a second location;

identifying, using the second determined location, a second user interface element among the rendered user interface elements;

determining that the second movement is part of the user removing a headset; and determining, based on the determination that the second movement is part of the user removing the headset, that the user is not selecting the second user interface element.

5. The computer-implemented method of claim 1, further comprising:

determining, using the sensor data, a type of gesture corresponding to the movement; and identifying the called function at least in part based on the type of gesture.

6. The computer-implemented method of claim 1, further comprising:

determining second user-relative locations for a second plurality of user interface elements; and rendering the second plurality of user interface elements at the second user-relative locations, the rendering comprising:

generating synthetic speech corresponding to textual labels of the second plurality of user interface elements;

applying transfer functions to the generated synthetic speech to produce transformed speech that appears to emanate from the second user-relative locations; and aurally outputting the transformed speech.

7. The computer-implemented method of claim 1, further comprising:

receiving second sensor data associated with a second movement of the user;

determining, using the second sensor data, a second location associated with the second movement; and identifying, using the second location, a selected one of a second plurality of user interface elements.

8. The computer-implemented method of claim 1, wherein a headset includes a physical interaction site, the method further comprising:

receiving second sensor data associated with a second movement of the wearable device;

determining, using the second sensor data, a second location corresponding to the second movement;

determine that the determined second location corresponds to a location of the physical interaction site; and calling a function registered in association with the physical interaction site.

9. A non-transitory computer-readable storage medium storing instructions that when executed by a computer processor perform actions comprising:

transitioning from a first power state to a second power state by dimming or shutting off a display of a client device of a user, wherein the second power state is a lower power state than the first power state;

rendering two or more user interface elements at two or more user-relative locations by, in response to transitioning to the second power state, using spatial sound to cause audio content to appear to originate from the two or more user-relative locations;

receiving sensor data associated with a movement of at least one of the client device or a wearable device of the user;

determining, using the sensor data, a location corresponding to the movement;

identifying, using the determined location, a user interface element among the two or more user interface elements; and calling a function registered in association with the user interface element, wherein the two or more user interface elements represent options to proceed with a current action and to go back, the two or more user-relative locations are to left and right sides of the user, the two or more user interface elements are rendered using text-to-speech on respective labels thereof and application of the spatial sound to make speech for the respective labels appear to emanate from the two or more user-relative locations, and the sensor data indicates turning of a head of the user toward one of the two or more user-relative locations.

10. The non-transitory computer-readable storage medium of claim 9, wherein the application of the spatial sound to make speech for the respective labels appear to emanate from the two or more user-relative locations includes application of head-related transfer functions.

11. The non-transitory computer-readable storage medium of claim 9, further comprising determining user-relative locations for a plurality of user interface elements, the determining comprising:

performing visual analysis on an image captured by an imaging device an augmented reality or virtual reality headset of a user;

identifying objects present within the image based on the visual analysis;

determining locations of the identified objects within the image;

ranking at least some of the user interface elements according to likelihoods of the user interface elements being selected by the user into high-likelihood user interface elements and low-likelihood user interface elements;

identifying lower-priority regions and higher-priority regions within the image displayed on the display based on the performed visual analysis of the image displayed on the display of the augmented reality or the virtual reality headset of the user, wherein lower-priority regions and higher-priority regions are distinguished from one another based on one or more of a presence of text, a uniformity of backgrounds, or an existence of movement; and assigning locations of the user interface elements to be within the lower-priority regions.

12. The computer-implemented method of claim 1, further comprising:

receiving second sensor data associated with a second movement of a wearable device of the user;

determining that the second movement corresponds to a second location;

identifying, using the second determined location, a second user interface element among the rendered user interface elements;

determining that the second movement is part of the user removing a headset; and determining, based on the determination that the second movement is part of the user removing the headset, that the user is not selecting the second user interface element.

13. The non-transitory computer-readable storage medium of claim 9, the actions further comprising:

determining, using the sensor data, a type of gesture corresponding to the movement; and identifying the called function at least in part based on the type of gesture.

14. The non-transitory computer-readable storage medium of claim 9, the actions further comprising:

determining second user-relative locations for a second plurality of user interface elements;

rendering the second plurality of user interface elements at the second user-relative locations, the rendering comprising:

generating synthetic speech corresponding to textual labels of the second plurality of user interface elements;

applying transfer functions to the generated synthetic speech to produce transformed speech that appears to emanate from the second user-relative locations; and aurally outputting the transformed speech.

15. The non-transitory computer-readable storage medium of claim 9, the actions further comprising:

receiving second sensor data associated with a second movement of the user;

determining, using the second sensor data, a second location associated with the second movement; and identifying, using the second location, a selected one of a second plurality of user interface elements.

16. The non-transitory computer-readable storage medium of claim 9, wherein a headset includes a physical interaction site, the actions further comprising:

receiving second sensor data associated with a second movement of the wearable device;

determining, using the second sensor data, a second location corresponding to the second movement;

determine that the determined second location corresponds to a location of the physical interaction site; and calling a function registered in association with the physical interaction site.

17. A client device comprising:

a computer processor; and a non-transitory computer-readable storage medium storing instructions that when executed by the computer processor perform actions comprising:

transitioning from a first power state to a second power state by dimming or shutting off a display of a client device of a user, wherein the second power state is a lower power state than the first power state;

rendering two or more user interface elements at two or more user-relative locations by, in response to transitioning to the second power state, using spatial sound to cause audio content to appear to originate from the two or more user-relative locations;

receiving sensor data associated with a movement of at least one of the client device or a wearable device of the user;

determining, using the sensor data, a location corresponding to the movement;

identifying, using the determined location, a user interface element among the two or more user interface elements; and calling a function registered in association with the user interface element, wherein the two or more user interface elements represent options to proceed with a current action and to go back, the two or more user-relative locations are to left and right sides of the user, the two or more user interface elements are rendered using text-to-speech on respective labels thereof and application of the spatial sound to make speech for the respective labels appear to emanate from the two or more user-relative locations, and the sensor data indicates turning of a head of the user toward one of the two or more user-relative locations.

18. The client device of claim 17, wherein the application of the spatial sound to make speech for the respective labels appear to emanate from the two or more user-relative locations includes application of head-related transfer functions.

19. The client device of claim 17, further comprising determining user-relative locations for a plurality of user interface elements, the determining comprising:

performing visual analysis on an image captured by an imaging device of an augmented reality or virtual reality headset of a user;

identifying objects present within the image based on the visual analysis;

determining locations of the identified objects within the image;

ranking at least some of the user interface elements according to likelihoods of the user interface elements being selected by the user into high-likelihood user interface elements and low-likelihood user interface elements;

identifying lower-priority regions and higher-priority regions within the image displayed on the display based on the performed visual analysis of the image displayed on the display of the augmented reality or the virtual reality headset of the user, wherein lower-priority regions and higher-priority regions are distinguished from one another based on one or more of a presence of text, a uniformity of backgrounds, or an existence of movement; and assigning locations of the user interface elements to be within the lower-priority regions.

20. The client device of claim 17, the actions further comprising:

receiving second sensor data associated with a second movement of a wearable device of the user;

determining that the second movement corresponds to a second location;

identifying, using the second determined location, a second user interface element among the rendered user interface elements;

determining that the second movement is part of the user removing a headset; and determining, based on the determination that the second movement is part of the user removing the headset, that the user is not selecting the second user interface element.

* * * * *